United States Patent
Margolis et al.

(10) Patent No.: US 8,571,259 B2
(45) Date of Patent: Oct. 29, 2013

(54) SYSTEM AND METHOD FOR AUTOMATIC IDENTIFICATION OF WILDLIFE

(76) Inventors: Robert Allan Margolis, West Vancouver (CA); Hannah Ruth Margolis, West Vancouver (CA)

(*) Notice: Subject to any disclaimer, the term of this patent is extended or adjusted under 35 U.S.C. 154(b) by 1077 days.

(21) Appl. No.: 12/456,576

(22) Filed: Jun. 17, 2009

(65) Prior Publication Data

US 2010/0322483 A1    Dec. 23, 2010

(51) Int. Cl.
*G06K 9/00* (2006.01)
*H04N 7/18* (2006.01)

(52) U.S. Cl.
USPC .............................. 382/103; 382/115; 348/61

(58) Field of Classification Search
None
See application file for complete search history.

(56) References Cited

U.S. PATENT DOCUMENTS

| | | | |
|---|---|---|---|
| 4,143,956 A | 3/1979 | Miyagawa | |
| 5,579,066 A | 11/1996 | Miyamoto et al. | |
| 6,333,988 B1 * | 12/2001 | Seal et al. | 382/117 |
| 6,424,727 B1 * | 7/2002 | Musgrave et al. | 382/117 |
| 6,476,963 B1 | 11/2002 | Chen | |
| 6,532,298 B1 * | 3/2003 | Cambier et al. | 382/117 |
| 6,546,368 B1 | 4/2003 | Weninger et al. | |
| 6,658,091 B1 * | 12/2003 | Naidoo et al. | 379/37 |
| 6,664,897 B2 * | 12/2003 | Pape et al. | 340/573.3 |
| 6,678,413 B1 * | 1/2004 | Liang et al. | 382/181 |
| 6,766,041 B2 * | 7/2004 | Golden et al. | 382/117 |
| 6,822,802 B2 | 11/2004 | Nakano et al. | |
| 7,039,220 B2 * | 5/2006 | Kriesel | 382/110 |
| 7,043,474 B2 * | 5/2006 | Mojsilovic et al. | 1/1 |
| 7,103,152 B2 * | 9/2006 | Naidoo et al. | 379/37 |
| 7,207,010 B2 | 4/2007 | Hirneisen et al. | |
| 7,209,588 B2 * | 4/2007 | Liang et al. | 382/181 |
| 7,377,233 B2 | 5/2008 | Patton | |
| 7,399,220 B2 * | 7/2008 | Kriesel et al. | 452/157 |
| 7,400,742 B2 * | 7/2008 | Popp | 382/100 |
| 7,444,961 B1 * | 11/2008 | Ellis | 119/842 |
| 7,454,334 B2 | 11/2008 | Agranat | |
| 7,496,228 B2 | 2/2009 | Landwehr et al. | |
| 8,108,144 B2 * | 1/2012 | Forstall et al. | 701/426 |
| 8,208,764 B2 * | 6/2012 | Guckenberger | 382/305 |
| 2001/0010549 A1 | 8/2001 | Miyake | |
| 2002/0021828 A1 * | 2/2002 | Papier et al. | 382/128 |

(Continued)

OTHER PUBLICATIONS

Burghardt, Tilo, Campbell, Neill, Individual Animal Identification Using Visual Biometrics on Deformable Coat-Patterns, 10 pages, Proceedings of the 5th International Conference on Computer Vision Systems (ICVS 2007), Applied Computer Science Group, Bielefeld University, Germany, 2007.

(Continued)

*Primary Examiner* — Manav Seth
(74) *Attorney, Agent, or Firm* — Dean Palmer IP Law/Property Inc.

(57) ABSTRACT

A system and method for automatically identifying wildlife in the field is disclosed that provides for identification of observed wildlife specimens without requiring the exercise of skill or judgment by the observer. The system and method for automatically identifying wildlife according to the invention also provides for automatic and easy to use identification of wildlife specimens in the field without distracting the user from wildlife observation. Wildlife identifications generated by the disclosed system and method may be easily stored in the field along with digital images of wildlife specimens, and corresponding location, time, date and elevation information, which may be easily transmitted and added to a wildlife identification database to allow compilation and archival of accumulated wildlife identification information from field observations of wildlife specimens.

20 Claims, 4 Drawing Sheets

(56) References Cited

U.S. PATENT DOCUMENTS

| | | |
|---|---|---|
| 2003/0128426 A1 | 7/2003 | Hammond |
| 2003/0151660 A1 | 8/2003 | Hirunuma et al. |
| 2003/0197929 A1 | 10/2003 | Lee |
| 2004/0012680 A1 | 1/2004 | Wu |
| 2004/0027657 A1 | 2/2004 | Steiner |
| 2004/0131254 A1* | 7/2004 | Liang et al. .................. 382/181 |
| 2004/0141635 A1* | 7/2004 | Liang et al. .................. 382/110 |
| 2004/0141636 A1* | 7/2004 | Liang et al. .................. 382/110 |
| 2005/0011470 A1 | 1/2005 | Skvorc, II |
| 2005/0180601 A1* | 8/2005 | Popp .......................... 382/103 |
| 2006/0120568 A1* | 6/2006 | McConville et al. ......... 382/115 |
| 2008/0133592 A1 | 6/2008 | Peters |
| 2009/0110730 A1* | 4/2009 | Fritz et al. .................... 424/484 |
| 2012/0148115 A1* | 6/2012 | Birdwell et al. .............. 382/116 |

OTHER PUBLICATIONS

Nadimpalli, Uma Devi, Image Processing Techniques to Identify Predatory Birds in Aquacultural Settings, Master of Science Thesis, Louisiana State University and Agricultural and Mechanical College, Louisiana, United States, May 2005.

* cited by examiner

SYSTEM AND METHOD FOR AUTOMATIC IDENTIFICATION OF WILDLIFE

TECHNICAL FIELD

The present invention relates generally to electronic image identification systems and associated computer software methods. More specifically, the present invention relates to a system and method for automatically identifying wildlife in the field, and archiving wildlife identification and associated information accumulated from field observations.

BACKGROUND OF THE INVENTION

The observation and identification of wildlife in the field is a popular activity practiced by a wide range of people, including relatively skilled and unskilled amateur wildlife observers, as well as highly skilled vocational and professional wildlife observers and scientists. Typically wildlife observers may use a magnifying scope or other optical device to better view wildlife specimens from a distance and allow closer visual examination of wildlife specimens than would be possible with the unaided eye. Additionally, photography and the use of other methods to capture images of wildlife specimens in the field are also popular activities commonly practiced in conjunction with the observation and identification of wildlife specimens.

A variety of scopes and other viewing devices are known for use in observing wildlife specimens in the field, including spotting telescopes, binoculars and even hunting scopes, which allow the observation of wildlife by users. Film and digital cameras and associated telescopic lenses are also well known for use in observing wildlife in the field, and for capturing images of observed wildlife specimens. Also, other viewing devices suitable for observing wildlife such as binoculars or spotting scopes are known which incorporate image sensors for capturing digital images of wildlife specimens observed through the associated viewing device. Binoculars with integrated image sensors are known in the art, examples of which are disclosed in US Patent application publications US 2003/0197929A1, US 2003/0128426A1, US 2004/0027657A1, US 2003/0128426A1. Similarly, spotting telescopes with integrated image sensors for capturing images of observed wildlife specimens are also known, as disclosed in U.S. Pat. No. 6,822,802, for example. Images of wildlife observed in the field may be used to assist in identification of the observed wildlife specimens, however, such identification remains undesirably dependent on the skill and judgment of the observer, which may vary significantly from one observer to another, and which may make wildlife identification by an unskilled or amateur observer particularly difficult.

Due to the difficulty in identification of wildlife specimens observed in the wild, particularly by unskilled or amateur observers, electronic or computer systems and associated software have been developed which attempt to assist the observer in identifying observed wildlife specimens. A system accepting input from an observer describing characteristic visual criteria related to an observed wildlife specimen is disclosed in US Patent Application Publication No. US 2008/0133592A1. A further system providing lists of potential characteristic visual criteria over a mobile phone for an observer to sequentially select in comparison with an observed wildlife specimen is disclosed in U.S. Pat. No. 7,207,010. However, such electronic or computer assisted wildlife identification systems are still dependent on the skill and judgment of the observer using the system, and on the accuracy of the observer's inputs, which may vary significantly between observers, particularly in the case of unskilled or amateur wildlife observers, making wildlife identification potentially difficult and/or inconsistent, for example. Additionally, such electronic or computer assisted systems for wildlife identification require a wildlife observer to provide detailed input to the system relating to characteristics of the observed wildlife while in the field, which may distract the user from his or her primary objective in the first place, that is, the observation of wildlife.

Accordingly, there remains a need for a means for identification of wildlife specimens observed in the field which can be easily used by in the field by a variety of wildlife observers with a wide range of skill in wildlife observation and identification, and which is not dependent on the judgment and skill of the observer in order to identify observed wildlife specimens.

SUMMARY OF THE INVENTION

It is an object of the present invention to provide a system for automatic identification of wildlife in the field that addresses some of the limitations of the prior art.

Another object of the present invention is to provide a method of automatically identifying wildlife in the field that addresses some of the limitations of the prior art.

It is a further object of the invention to provide a computer readable medium and computer implemented method of automatically identifying wildlife in the field that addresses some of the limitations of the prior art.

According to an embodiment of the invention, a system for automatic identification of wildlife in the field is provided. The system comprises an optical viewing device comprising a digital image sensor operable to capture a digital image of a wildlife specimen viewed by a user through said optical viewing device, an image processing device comprising a power source, an image storage memory, a digital image processor executing a wildlife recognition program, a global positioning system receiver and a display which are electrically interconnected wherein the image processing device is operable to be carried by a user in the field, and a wildlife server comprising a data storage medium and a processor executing a database program, which is operable to store wildlife identification data. The optical viewing device is connected in communication with the image processing device and is operable to transfer the digital image to the image processing device. The image processing device is operable to generate an identification of the wildlife specimen and to store the digital image, the identification, and an associated location, time and date corresponding to the digital image. The wildlife server is connected in communication with the image processing device and is operable to receive the digital image, the identification and the associated location, time and date from the image processing device.

According to an additional embodiment of the present invention, in the above-described system for automatic identification of wildlife in the field, the optical viewing device may comprise one or more of: a spotting telescope, a digital camera, a rifle scope and binoculars.

According to another embodiment of the present invention, a method of automatically identifying wildlife in the field is provided. The method comprises providing an optical viewing device for observing a wildlife specimen comprising a digital optical sensor and a trigger; capturing a digital image of the wildlife specimen in response to the operation of the trigger; transmitting the digital image to an image processing device comprising a digital image processor and an image storage memory; processing the digital image to generate an identification of the wildlife specimen using at least one visible characteristic of the digital image; storing the identification, the digital image and an associated location, time and date corresponding to the digital image in the image storage memory; transmitting the identification, the digital image and associated location, time and date to a wildlife server comprising a wildlife database; and storing the identification, the digital image and the associated location, time and date in the wildlife database.

According to a further embodiment of the invention, the step of processing the digital image in the above-described method of automatically identifying wildlife in the field may additionally comprise executing computer readable instructions to recognize at least one visible characteristic of the digital image of the wildlife specimen and to generate an identification of the wildlife specimen by comparing the at least one visible characteristic with a plurality of known wildlife characteristics.

According to yet a further embodiment of the invention, in the above-described method of automatically identifying wildlife in the field, the identification of the wildlife specimen may comprise identification of one or more of a species, a sub-species, a gender, an age, and an individual animal identification of the specimen.

BRIEF DESCRIPTION OF THE DRAWINGS

The system and method of the present invention will now be described with reference to the accompanying drawing figures, in which.

Like reference numerals refer to corresponding parts throughout the several views of the drawings.

DETAILED DESCRIPTION OF THE INVENTION

Figure 1:
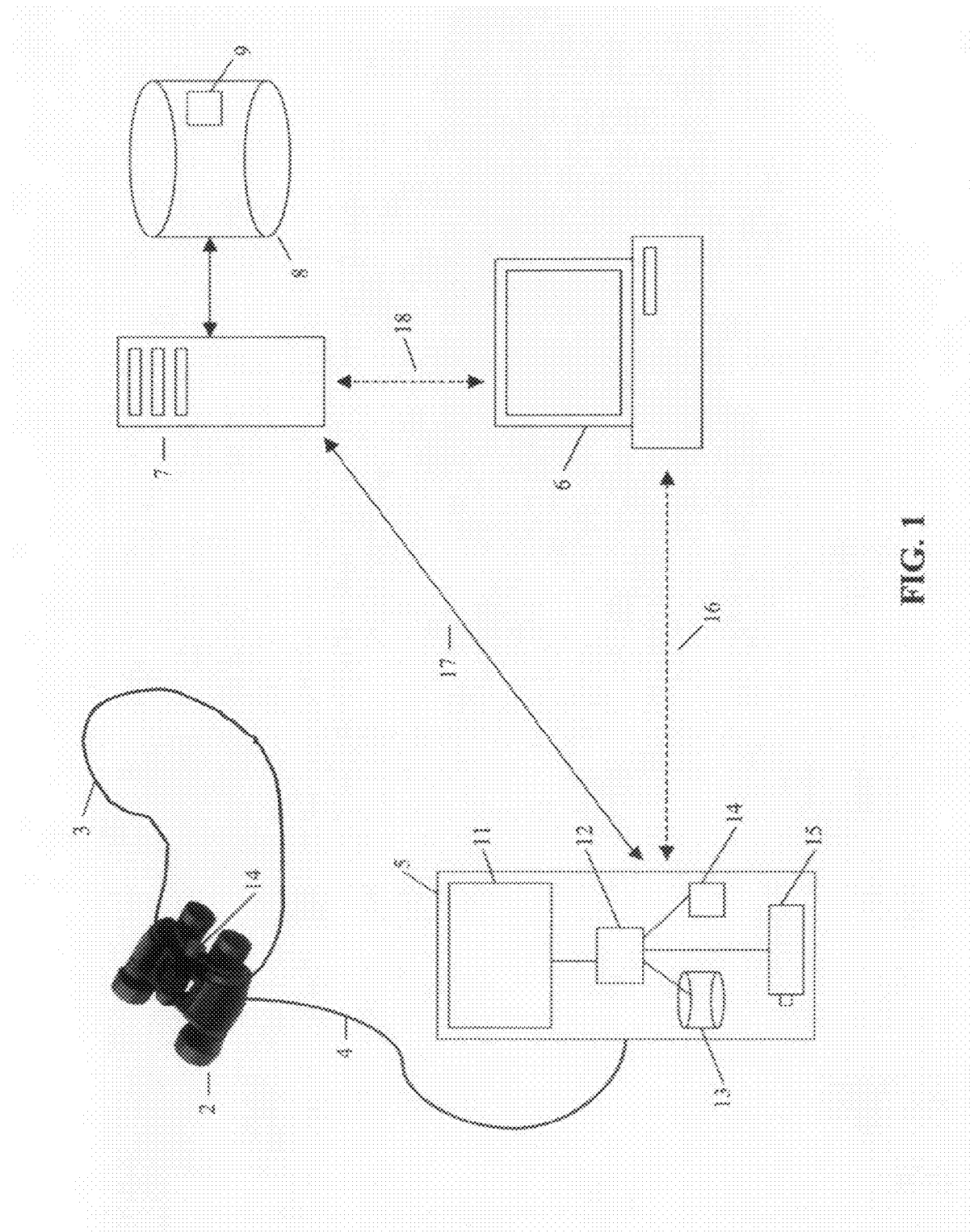
FIG. 1 illustrates an exemplary schematic view of an automatic wildlife identification system according to an embodiment of the present invention.

Referring to FIG. 1, an exemplary schematic view of an automatic wildlife identification system in accordance with an embodiment or the present invention is shown. The system includes an optical viewing device 2 suitable for use in the field by a user for viewing wildlife specimens. In one embodiment the optical viewing device 2 may comprise binoculars 2 which may be worn by a user in the field such as by means of a neck-strap or harness 3, for example, as illustrated in the exemplary embodiment of FIG. 1. In other embodiments, the optical viewing device 2 may alternatively comprise one or more of a spotting telescope, a digital camera, or a rifle scope, for example. The optical viewing device 2 includes at least one digital image sensor (not shown) that is operable to capture digital images of objects viewed through the device 2, such as wildlife specimens including birds or animals, for example, which are viewed through the device 2 by a user in the field. In one embodiment, the optical viewing device 2 may comprise binoculars of a porro prism or roof prism design, for example, and include a digital image sensor which may be interposed in the optical path of the binoculars such as by a mirror or beam-splitting element or other method known in the art, to enable the digital image sensor to capture objects viewed through the binoculars. The digital image sensor may comprise any suitable sensor design known in the art, such as a CCD or CMOS sensor, for example, as are known for use in digital imaging. The optical viewing device 2 also includes a trigger 14 such as a button or other switch means which is preferably manually operable by a user to trigger the capture of a digital image using the digital image sensor.

The optical viewing device 2 is connected in communication with an image processing device 5, such as by means of a wired digital connection cable 4, or alternatively by a wireless digital connection, such as a Bluetooth™ IEEE 802.11b, or other wireless digital connection, for example. In one embodiment, connection cable 4 may be connected to a weather-proof port (not shown) on the optical viewing device 2 to provide a robust digital connection with image processing device 5, and may also desirably be attached to or threaded through a portion of a neck strap 3 or harness attached to the optical viewing device 2. The connection between the optical viewing device 2 and the image processing device 5 is operable to transmit a digital image captured by the digital image sensor to the image processing device upon operation of the trigger 14 by a user.

Image processing device 5 preferably includes a digital image processor 12, an image storage memory 13, a global positioning system (GPS) receiver 14, a power source 15, and a display 11. The above-described components of the image processing device may be arranged and electrically connected according to any suitable technique known in the art, such as by the use of electronic circuit boards for example, such as may commonly be used in similar integrated digital devices, such as digital music players, digital cameras and cellular telephones, for example. Digital image processor 12 may preferably comprise any suitable digital processor operable to process digital image data and image identification or recognition software instructions, such as a general purpose digital processor, or a specialized digital image processor such as an ASIC image processor, for example. GPS receiver 14 may comprise any suitable known digital GPS receiver component, operable to determine the geographical location of the user using the device 5 in the field at a time the user operates the trigger 14 on the optical viewing device 2 to capture a digital image. Image storage memory 13 may comprise any suitable known type of digital memory suited for conveniently and compactly storing digital images and other data, such as flash RAM, miniature magnetic hard-disk, or other similar digital memory, for example. Display 14 may comprise any suitable known type of digital display suitable for graphically displaying digital images and related information to a user in the field, such as LCD or organic LED (OLED) type displays, for example. Power source 15 may comprise any suitable known power source for powering a digital device in the field, such as one or more of alkaline or other non-rechargeable batteries, NiCad, NiMH or lithium-ion rechargeable batteries, or lithium-polymer rechargeable cells, for example.

The digital image processor 14 of device 5 is operable to execute image recognition or identification software instructions, to enable the processor to process a digital image of a wildlife specimen captured by the digital image sensor in optical viewing device 2. The image processor 14 is then operable to generate an identification of the wildlife specimen by comparing at least one visible characteristic from the captured image with known characteristics of wildlife specimens, according to the image identification software instructions stored in the image processing device 5, such as in storage memory 13 for example. A wildlife identification may comprise one or more of an identification of a species, sub-species, variety, gender and/or age of a wildlife specimen captured in the digital image, based on the comparison of at least one visible characteristic from the captured image with known characteristics of wildlife specimens. In one embodiment, a wildlife identification may also optionally include the identification of the individual animal captured in the digital image, based on the comparison of at least one visible characteristic from the captured image with known characteristics of wildlife animals. Accordingly, identifications of wildlife specimens may be made for a wide variety of wildlife which may be observed by a user in the field including without limitation, birds, mammals, insects such as butterflies, reptiles and amphibians, for example.

In one embodiment, GPS receiver 14 may be operable to determine the time, date and elevation as well as the geographical location of the image processing device 5 at a time that a user operates the trigger 14 on the optical viewing device 2 to capture a digital image. In another embodiment, the image processing device 5 may additionally include a digital clock to determine the time and/or date that a user captures a digital image. In a further embodiment, the image processing device 5 may additionally include a digital altimeter to determine the elevation of the device 5 at the time a user captures a digital image. The image processor 14 is also operable to associate one or more of a location, time, date and elevation with the digital image received from the optical viewing device 2, and the identification of the wildlife specimen generated by the processor 14, and to store all this information in the image processing device 5, such as in storage memory 13.

In a preferred embodiment, the image processing device 5 may be of such a size and weight that it may be easily carried and/or worn by a user while observing wildlife in the field. In one embodiment, the image processing device 5 may be enclosed in a suitably rugged case so as to enable use in a variety of outdoor field conditions. In another embodiment, the power source 15 of the image processing device 5 may desirably also provide power for the digital image capture operation of the digital image sensor in the optical viewing device 2, such as by providing power through connection cable 4. In a further alternative embodiment, the image processing device 5 may be physically integrated into the optical viewing device 2, or otherwise physically attached to the optical viewing device 2.

The image processing device 5 is operable to be connected in communication with a wildlife server 7, such as through any suitable wired or wireless connection 17 such as described above, or through connection through a computer network, for example, to enable the transmission of digital image, wildlife identification, location, time, date and/elevation data between the image processing device 5 and the wildlife server 7. In an optional embodiment, image processing device 5 may also be connected in communication with a user or client computer 6 such as by connection 16. In such an embodiment, the user computer 6 may also optionally be connected in communication with the wildlife server 7 such as by connection 18, and the image processing device 5 may alternatively be connected to the wildlife server 7 through the user computer 6.

User or client computer 6 includes standard computer components for transmitting and receiving data to and from other computers and electronic devices, such as image processing device 5 and wildlife server 7, and for storing data on user computer 6, such as digital image, wildlife identification, location, time, date and/or elevation data received from image processing device 5, for example. In one embodiment, user computer 6 may desirably store all digital image, wildlife identification, location, time, date and/or elevation data received from image processing device 5 on the user computer 6, to provide a record of all wildlife specimens captured by a user in the field, and associated identifications and other associated data, to form a personal list of wildlife observations for one or more users, for example.

Wildlife server 7 includes standard computer components for transmitting and receiving data to and from other computers and electronic devices, such as one or more image processing devices 5 and user or client computers 6, and for storing such data. Wildlife server 7 includes wildlife database 8 for storing digital images, wildlife identifications, and associated location, time, date and/or elevation data received from image processing devices 5 (including through user computers 6). Such data may be stored in a wildlife database record 9, for example. Wildlife database 8 may preferably include database records 9 corresponding to each of multiple users who may transmit wildlife identification, image and associated data to the wildlife server 7 and subsequently to wildlife database 8 for storage. Wildlife database 8 may also preferably be operable to compile all wildlife identification, image and associated information stored in wildlife database 8 to provide an inventory of wildlife specimens observed and identified by users using image processing devices 5 in the field and transmitting field captured wildlife information to the wildlife server 7 and subsequently to wildlife database 8 for storage. The wildlife database 8 may further desirably be operable to enable searches and queries of wildlife database records 9 stored in the database 8, such as queries defining one or more specific wildlife identification, location, time, date, elevation or other associated data stored in wildlife database 8, for example. Accordingly, wildlife database 8 may desirably provide a continuously and immediately updated compilation of wildlife identification, image and associated data captured in the field by multiple users, and transmitted by image processing devices 5 to the wildlife database 8.

Figure 2:
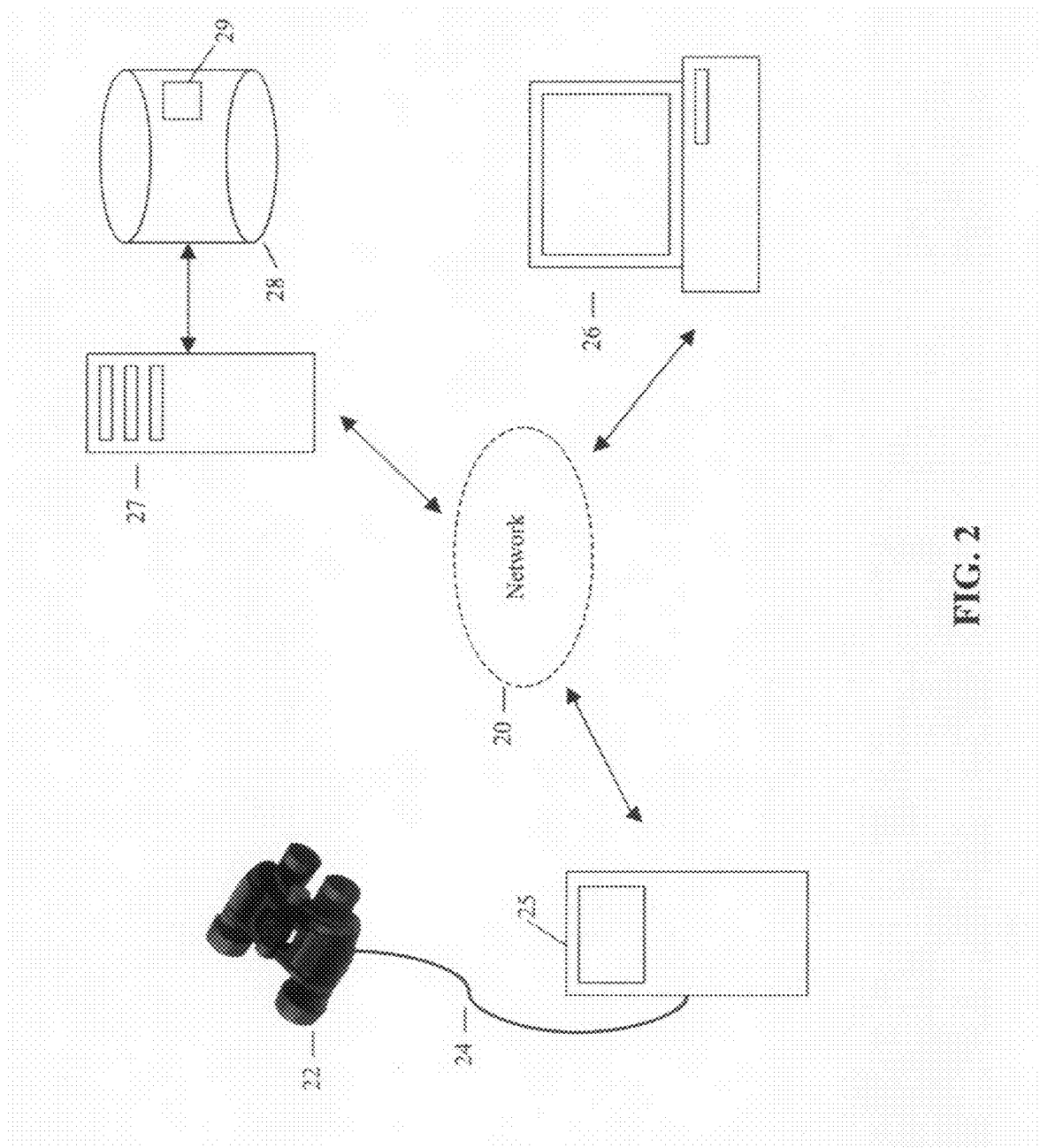
FIG. 2 illustrates an exemplary networked operating environment for implementing an embodiment of the present invention.

Referring now to FIG. 2, an exemplary networked operating environment for implementing an embodiment of the present invention is shown. In the exemplary networked environment shown in FIG. 2, the optical viewing device 22 may be connected in communication with the image processing device 25 by a wired cable 24, or alternatively by a suitable wireless connection, as described above with in reference to FIG. 1. The image processing device 25 is connected in communication with a computer network 20, such as a local or wide area network, a home computer network, or the internet, for example. Such connection of image processing device 25 to computer network 20 may be by any suitable known method of electronic connection operable for data transmission, including wired, wireless or otherwise.

A user or client computer 26 may also be connected to computer network 20 such as to enable transmission of data between the image processing device 25 and user computer 26. In particular, a user of the system may transmit wildlife identification, image and associated data from an image processing device 25 to the user computer 26. In one embodiment, the user computer 26 may then store the data received from the image processing device 25, to provide a compilation of a user's wildlife identifications and images and the data associated therewith accumulated in the field, such as a personal list of wildlife identifications for a user. In another embodiment, the user computer may optionally store the data received from the image processing device 25, and may also transmit the data to the server computer 27 also connected to the network 20. In another embodiment, the user computer 26 may be connected to the image processing device 25 by a direct connection, such as a wired cable or wireless direct connection, in place of connection through network 20, for example, while user computer 26 may still remain connected to wildlife server 27 through network 20. User computer 26 includes standard computing components for receiving and transmitting data to and from other computers and/or electronic devices connected to network 20, and for performing other standard computing functions, as is well known in the art.

Wildlife server 27 is connected to computer network 20 such as to enable transmission of data between one or more of an image processing device 25, and a user or client computer 26, for example. Similar to as described above in reference to FIG. 1, wildlife server 27 includes wildlife database 28 which stores one or more wildlife data records 29. In one embodiment, wildlife database 28 may comprise a conventional data storage device such as a hard disk or solid-state memory device located with and connected directly to wildlife server 27. In another embodiment, wildlife database 28 may comprise a remote data storage facility connected in communication with wildlife server 27 to enable the storage of wildlife identification, image and associated data received by wildlife server 27 from one or more of image processing device 25 and user computer 26. Wildlife server 27 includes standard computing components for receiving and transmitting data to and from other computers and/or electronic devices connected to network 20, and for storing and retrieving data to and from wildlife database 28, as is well known in the art.

Figure 3:
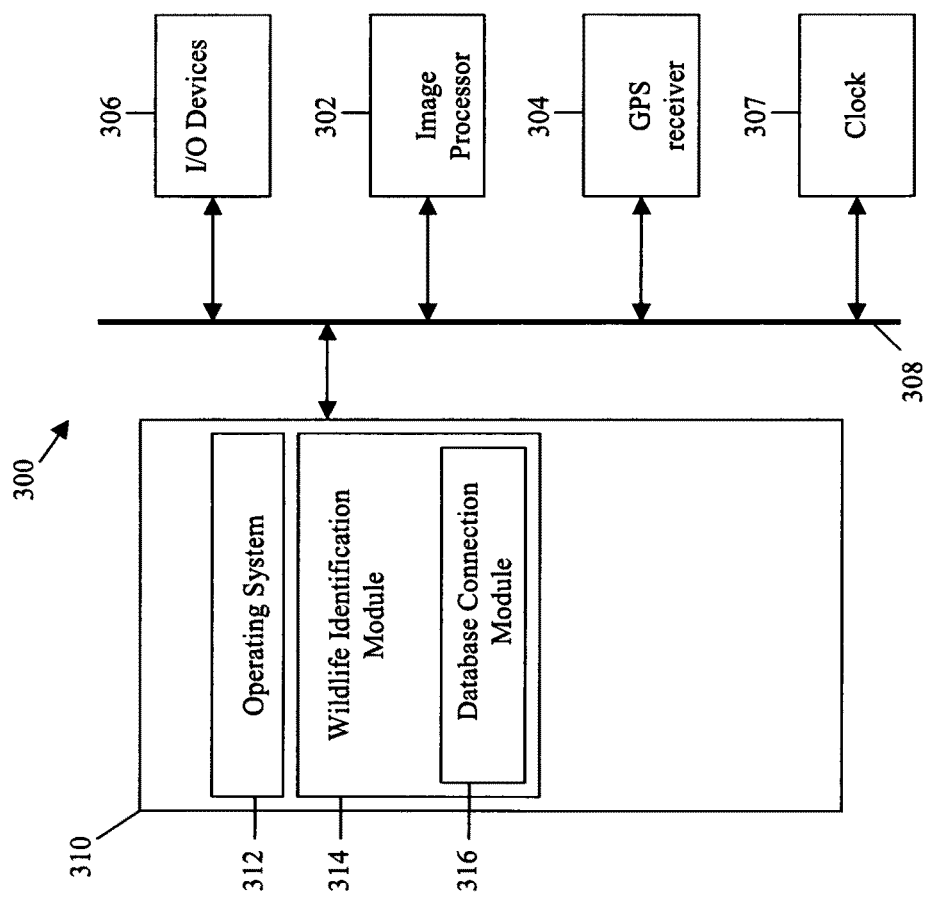
FIG. 3 illustrates an exemplary image processing device architecture configured according to an embodiment of the invention.

FIG. 3 illustrates an exemplary architecture for an image processing device 300, configured according to an embodiment of the invention. According to one embodiment of the invention, the image processing device 5 as described above in reference to FIG. 1, and/or the image processing device 25 as described above in reference to FIG. 2 may also be configured similarly to the exemplary architecture of the image processing device 300 illustrated in FIG. 3. In the exemplary illustrated embodiment, the image processing device 300 includes standard computing and electronic circuitry components, including an image processor 302 and input/output devices 306, which are linked by a bus 308. The input/output devices 306 may comprise a keyboard or buttons, a cursor controller such as a trackball, directional pad, joystick, or mouse, a touch screen or other display, and the like, for example. The input/output devices 306 may also include a data transfer or communications port or connection, such as a wired communication cable connection, or a wireless communication connection, or a network connection, for example. Such data transfer and/or communications connection may desirably provide for interfacing with another electronic device and/or computer, or a computer network, such as the exemplary network 20 described above, thereby allowing the image processing device 300 to transfer data to and/or from other devices or computers, and thereby to operate in a networked environment. Also connected to the bus 308 is a computer-readable memory 310. The memory 310 stores executable instructions to implement exemplary functions associated with an aspect of the invention. The computer-readable memory 310 may comprise any suitable known computer-readable media or device that can be accessed by the image processing device 300, such as a flash RAM or miniature hard disk, or other suitable memory device or media, for example. A GPS receiver 304 is also connected to the bus 308, and may comprise any suitable type of GPS receiver known in the art that is operable to provide digital geographical location information to the image processing device 300. In one embodiment the GPS device may also be operable to provide time, date and/or elevation information to the device 300. In another embodiment, the image processing device 300 may also include a digital clock 307 connected to the bus 308 for providing time and/or date information to the device 300. In yet another embodiment, a digital altimeter device (not shown) may also be connected to bus 308 to provide digital elevation information to the image processing device 300.

In an embodiment of the invention, one or more of the following program modules and data files may be stored in the image storage memory 310 of the image processing device 300: an operating system module 312, a wildlife identification module 314 and a database connection module 316.

The operating system module 312 may be suitable for controlling the operation of the image processing device 300, and in particular may comprise instructions for handling various system services, such as data file manipulation services or for accessing other hardware components included in the image processing device 300. Operating system module 312 may also comprise computer readable instructions for standard device operation, including receiving input from an optical viewing device including wildlife specimen images, and for displaying output in a graphical format on a display, for example.

The wildlife identification module 314 comprises computer readable instructions for processing a digital image of a wildlife specimen received from an optical viewing device, and for generating an identification of the wildlife specimen using at least one visible characteristic of the wildlife specimen in the digital image. The wildlife identification module 314 also comprises instructions for determining an associated geographical location, time and date corresponding to the digital image, such as by obtaining such associated data from the GPS receiver 304, or optional clock 307. In one embodiment, the geographical location additionally comprises an elevation such as may be obtained from the GPS receiver 304, or optionally from an altimeter (not shown) as described above. The wildlife identification module 314 further comprises instructions for storing the digital image received from the optical viewing device, the identification of the wildlife specimen generated using the digital image, and the associated geographical location, time, date and/or elevation corresponding to the digital image on an image storage memory within memory 310.

In an alternative embodiment, the wildlife identification module 314 may additionally comprise instructions for determining whether the digital image represents a "hit" or a "miss" of the wildlife specimen captured in the digital image. Such alternative embodiment may be particularly applicable to use of the system and method of the invention where the optical viewing device comprises a rifle scope, such as may be attached to a replica or otherwise inoperative rifle or other firearm, for example. In such a manner, the wildlife identification module 314 may comprise instructions to process the digital image received from the optical viewing device (rifle scope) to both generate an identification of the wildlife specimen, and to determine if the digital image captured by the rifle scope represents a "hit" or "miss" of the wildlife specimen. The determined "hit" or "miss" designation may accordingly be stored in the memory 310 in combination with the wildlife identification, digital image, and associated location, date and time, for example, and may thereby be used as part of a virtual hunting game where a user attempts to capture digital images of wildlife specimens which constitute a "hit", such as by centering of a wildlife specimen in the center of a virtual target area in the rifle scope optical viewing device, for example.

The database connection module 316 comprises computer readable instructions for transmitting wildlife identification and digital image, and associated location, time and date data from the image processing device 300 to a wildlife server, which may preferably also include instructions for establishing a connection with a wildlife server and/or other computers or electronic devices. The database connection module 316 may also desirably comprise instructions for accessing a wildlife database on the wildlife server, and for storing the wildlife identification, digital image, and associated location, time and date data on the wildlife database. The database connection module 316 may also optionally comprise instructions for connecting with and transmitting wildlife identification, image, location, time and date data to a user or client computer, in addition to a wildlife server, for example.

Further details with regards to the computer readable instructions comprised in the exemplary wildlife identification module 314 and database connection module 316 are described below in reference to FIG. 4.

The above described exemplary program modules 312, 314 and 316 incorporate instructions to implement processing operations associated with aspects of the invention. Various embodiments of the processing operations of the above-described program modules are described below with reference to FIG. 4. The program modules stored in memory 310 are exemplary in nature, and additional modules can be included. It should also be appreciated that the functions of the presented modules may be combined. In addition, a function of a program module need not be performed on a single machine or electronic device, instead, some functions, such as some functions described above in relation to the database connection module 316 for example, may be distributed across a connection between machines if desired, such as across a computer network to one or more other computers. In such case, it is to be understood that it is the functions of the described method aspect of the invention that are significant, not where the functions are performed or the specific manner in which they are performed.

Figure 4:
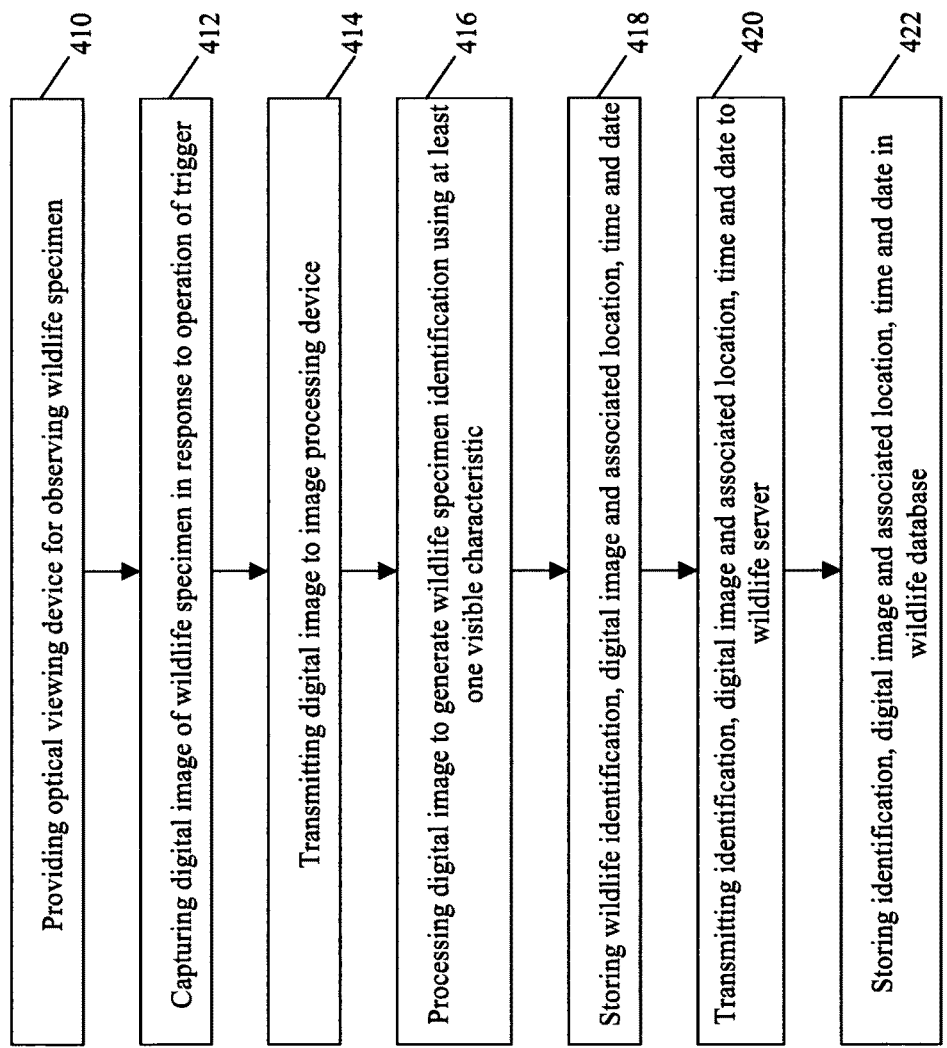
FIG. 4 illustrates a series of operations associated with an automatic wildlife identification method according to an embodiment of the invention.

FIG. 4 illustrates a series of operations associated with an automatic wildlife identification method that may be implemented by the system illustrated in FIG. 1 according to an embodiment of the invention. In the first operation 410 of FIG. 4, an optical viewing device 2 is provided for observing wildlife specimens by a user in the field. In a preferred embodiment, the optical viewing device comprises a digital image sensor for capturing a digital image of wildlife specimens viewed through the device, and a trigger 14 for a user to operate to initiate the capture of a digital image. As described above in reference to FIG. 1, in one embodiment of the invention the optical viewing device 2 may comprise a spotting telescope, a digital camera, a rifle scope or other hunting target scope, and/or binoculars, for example.

In the second operation 412 of FIG. 4, a digital image of a wildlife specimen is captured in response to the operation of the trigger 14. In a preferred embodiment, the operation of the trigger 14 of the optical viewing device 2 by a user will substantially instantaneously initiate the capture of a digital image of the field of view of the user through the optical viewing device 2. Accordingly, a digital image of a wildlife specimen being viewed by the user through the optical viewing device may be accurately captured by the user's operation of the trigger 14, similar to the operation of a shutter release or other trigger on other types of digital imaging devices such as digital cameras which are known in the art.

In the third operation 414 of FIG. 4, the digital image captured by the optical viewing device 2 is transmitted to the image processing device 5. As described above in reference to FIG. 1, the image processing device 5 preferably comprises an image processor 12 and an image storage memory 13. The digital image may be transferred from the optical viewing device 2 to the image processing device 5 by any suitable known data transfer connection, such as connection by a wired data transfer cable 4, or alternatively by any suitable wireless data transfer connection, or over a computer network, as may be known in the art. In one alternative embodiment of the present invention, the image processing device 5 may be integrated into or otherwise physically attached to the optical viewing device 2.

In the next operation 416 of FIG. 4, the digital image is processed to generate a wildlife specimen identification using at least one visible characteristic of the digital image. The operation 416 may be implemented by the image processor 304 of the image processing device 300, such as by executing wildlife identification program instructions stored in wildlife identification module 313 of memory 310, for example. As described above, in one embodiment the identification of the wildlife specimen may include one or more of a species, a sub-species, a gender, and/or an age of the wildlife specimen. In another embodiment, the wildlife specimen identification may include an identification of the individual animal captured in the digital image of the wildlife specimen, such as may be desirable in order to identify individuals of a particular known animal population, for example. In a particular exemplary embodiment of the invention, the identification of the wildlife specimen may be generated by the image processor 12, by executing computer readable instructions to recognize at least one visible characteristic of the digital image of the wildlife specimen and thereby to generate an identification of the wildlife specimen by comparing at least one visible characteristic with a plurality of known wildlife characteristics. The known wildlife characteristics may be stored in the image processing device 5, such as in memory 310, and more particularly, such as in wildlife identification module 313, for example.

In a further embodiment of the present invention, a user may determine the desired level of identification of the wildlife specimen to be generated by the image processing device 5, such as by selecting a desired identification level, for example. In yet a further embodiment, the level of identification of the wildlife specimen generated by the image processing device 5 may be automatically determined, such as by the nature and definition of visible characteristics captured in the digital image of the wildlife specimen, or by the ability of the wildlife identification program stored in wildlife identification module 313 to recognize one or more visible characteristics in the digital image of the wildlife specimen, for example.

In the next operation 418 of FIG. 4, the wildlife identification, digital image and an associated location, time and date corresponding to the digital image are stored in the image storage memory 13 of image processing device 5. In one embodiment, operation 418 may be implemented by the image processor 304 of the image processing device 300, such as by executing program instructions stored in memory 310 and particularly in wildlife identification module 313, for example. In a preferred embodiment, the location, time and date associated with the digital image are determined such that they correspond to the time the digital image of the wildlife specimen is captured using the optical viewing device. In one embodiment, the GPS receiver 304 may be used to generate the location, time and date corresponding to the digital image, which represents the geographical location of the image processing device 5 and the time and date when the digital image was captured in the field. Accordingly, this location, time and date data are then stored in the image storage memory 13 along with the wildlife identification and the digital image.

In an optional embodiment, the GPS receiver 304 may also be used to generate an elevation corresponding to the elevation of the image processing device 5 at the time the digital image was captured. Such elevation data may also be stored in the image storage memory 13 along with the wildlife identification and the digital image. In another optional embodiment, a separate altimeter in the image processing device 5 may instead be used to generate elevation data corresponding to the digital image. In yet a further optional embodiment, an optional clock 307 in the image processing device 5 may be used to generate the time and date data which may be stored in the image storage memory 13.

In a further embodiment of the invention, operation 418 may also include displaying the wildlife identification, digital image and one or more of the associated location, time and date to a user. In such an embodiment, the display 11 such as an LCD, or OLED or other suitable display in image processing device 5 may be used to display the wildlife identification, digital image and associated data to the user.

In the next operation 420 of FIG. 4, the wildlife identification, digital image and an associated location, time and date corresponding to the digital image are transmitted to a wildlife server 7. In one embodiment, operation 420 may be implemented by the image processor 302 of the image processing device 310, such as by executing program instructions stored in memory 310 and particularly in database connection module 316, for example. As described above in reference to FIG. 1, the wildlife server 7 preferably comprises a wildlife database 8. The wildlife identification, digital image and associated location, time and date corresponding to the digital image may be transmitted from the image processing device 5 to the wildlife server 7 by any suitable data transfer connection known in the art, such as connection by a wired or wireless data transfer connection, or preferably such as by connection over a computer network such as a local or wide area network, or the internet, for example.

In one embodiment of the invention, operation 420 of FIG. 4 may also include the transmission of the wildlife identification, digital image and associated location, time and date to a user or client computer 6. In such an embodiment, the wildlife identification, digital image and associated location, time and date may be transmitted from the image processing device 5 to the user computer 6 by any suitable data transfer connection known in the art, such as connection by a wired data cable, or a wireless data connection, or by connection over a computer network, for example. In a particular such embodiment, the wildlife identification, digital image and associated location, time and date may be stored in a storage memory on the user or client computer 6, and may then further be transmitted to the wildlife server 7 from the user or client computer 6, such as over a computer network like the internet, for example.

In the final operation 422 of FIG. 4, the wildlife identification, digital image and an associated location, time and date corresponding to the digital image are stored in the wildlife database 8. In one embodiment, operation 422 may be implemented by wildlife server 7, such as by executing program instructions stored in a memory of the wildlife server 7, for example. In a particular embodiment of the invention, the wildlife identification, digital image and associated location, time and date may be stored in the wildlife database 8 in a database record 9, according to any suitable method or technique such as are known in the database art. Desirably, the wildlife identification, digital image and associated location, time and date data may be stored in the wildlife database 8 so as to allow searches and queries to be applied to the wildlife database 8, such as queries returning one or more specific wildlife identifications, locations, times, dates, or other associated data stored in wildlife database 8, for example. Thereby, wildlife database 8 may desireably provide a continuously and immediately updated compilation of wildlife identification, image and associated data captured in the field by multiple users, and transmitted and stored in the wildlife database 8.

An exemplary embodiment of the present invention relates to a computer storage product with a computer-readable medium having computer code thereon for performing various computer-implemented operations as described above in reference to aspects of the present invention. The computer-readable media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using XML, JavaScript, C#, C++, or other scripting, markup and/or programming languages and development tools. Another embodiment of the invention may be implemented in hard-wired circuitry in place of, or in combination with, machine-executable software instructions.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for automatic identification of wildlife in the field comprising:
   a viewing device comprising a digital image sensor operable to capture a digital image of a wildlife specimen viewed by a user through said viewing device, and an optical viewing device;
   an image processing device comprising a power source, an image storage memory, a digital image processor executing a wildlife recognition program, a global positioning system receiver and a display which are electrically interconnected, and wherein said image processing device is operable to be carried by a user in the field;
   a wildlife server comprising a data storage medium including a database and a processor executing a database program, operable to store wildlife identification data;

wherein said optical viewing device is connected in communication with said image processing device and is operable to transfer said digital image to said image processing device;

wherein said image processing device is operable, following a single input by said user, to generate an identification of said wildlife specimen and to store said digital image, said identification, and at least one of: an associated location, time, and date, corresponding to said digital image;

wherein said wildlife server is connected in communication with said image processing device and is operable to receive at least one of said digital image, said identification and said associated location, time and date from said image processing device;

wherein the database provides a continuously updated compilation of wildlife data captured in the field by multiple users; and wherein said display displays a said identification to said user.

2. The system according to claim 1 wherein said viewing device comprises one or more of: a spotting telescope, a digital camera, a rifle scope and binoculars.

3. The system according to claim 1 wherein said viewing device is connected to said image processing device by a cable.

4. The system according to claim 1 wherein said identification of said wildlife specimen comprises one or more of: a species, a sub-species, a gender, an age, and an individual animal identification of said wildlife specimen.

5. The system according to claim 1 wherein said wildlife database server is connected to said image processing device by one or more of a cable and a computer network.

6. The system according to claim 1 wherein said viewing device comprises said image processing device.

7. The system according to claim 1 wherein said image processing device additionally comprises a digital altimeter.

8. The system according to claim 7 wherein said image processing device is further operable to store an associated elevation corresponding to said digital image.

9. The system according to claim 1 wherein said digital image sensor comprises one or more of a CCD and a CMOS sensor.

10. A method of automatically identifying wildlife in the field, comprising:
  providing a viewing device for observing a wildlife specimen comprising a digital optical sensor, an optical viewing device, and a trigger;
  capturing a digital image of said specimen in response to the engagement of said trigger;
  transmitting said digital image to an image processing device comprising a digital image processor and an image storage memory;
  processing said digital image to generate an identification of said wildlife specimen using at least one visible characteristic of said digital image;
  storing at least one of said identification, said digital image and an associated location, time, and date corresponding to said digital image in said image storage memory;
  transmitting at least one of said identification, said digital image and said associated location, time, and date to a wildlife server comprising a wildlife database;
  storing at least one of said identification, said digital image and said location, time, and date in said wildlife database;
  wherein the database provides a continuously updated compilation of wildlife data captured in the field by multiple users; and
  displaying said identification.

11. The method according to claim 10, wherein said viewing device comprises one or more of: a spotting telescope, a digital camera, a rifle scope and binoculars.

12. The method according to claim 10, wherein said identification of said wildlife specimen comprises one or more of: a species, a sub-species, a gender, an age, and an individual animal identification of said wildlife specimen.

13. The method according to claim 10, wherein said processing comprises executing computer readable instructions to recognize at least one visible characteristic of said digital image of said wildlife specimen and to generate an identification of said wildlife specimen by comparing said at least one visible characteristic with a plurality of known wildlife characteristics.

14. The method according to claim 10, wherein transmitting said identification, said digital image and at least one of said location, time, and date to a wildlife server additionally comprises transmitting said identification, said digital image and said location, time and date to a client computer.

15. The method according to claim 14 additionally comprising storing said identification, said digital image and said location, time and date on said client computer.

16. The method according to claim 10, wherein said transmitting comprises transmitting by means of one or more of a wired or a wireless digital connection.

17. The method according to claim 10 wherein said associated location comprises a location generated by a global positioning system receiver when said digital image is captured.

18. The method according to claim 17 wherein said associated location additionally comprises an elevation generated by one or more of: a global positioning system receiver and an altimeter, when said digital image is captured.

19. The method according to claim 10 wherein said associated time and date comprise a time and date generated by one or more of: a global positioning receiver and a digital clock, when said digital image is captured.

20. The method according to claim 10 additionally comprising displaying said identification, said digital image and at least one of said location, time, date and elevation to a user, following said processing.

* * * * *